(12) United States Patent
Adams

(10) Patent No.: US 7,011,418 B2
(45) Date of Patent: Mar. 14, 2006

(54) REFLECTIVE SHEETING FOR TRACTOR-TRAILER

(75) Inventor: James H. Adams, Tallmadge, OH (US)

(73) Assignee: East Manufacturing Corporation, Randolph, OH (US)

( * ) Notice: Subject to any disclaimer, the term of this patent is extended or adjusted under 35 U.S.C. 154(b) by 105 days.

(21) Appl. No.: 10/302,597

(22) Filed: Nov. 21, 2002

(65) Prior Publication Data

US 2004/0101656 A1    May 27, 2004

(51) Int. Cl.
*G02B 5/124*    (2006.01)

(52) U.S. Cl. .................. 359/533; 359/548

(58) Field of Classification Search ........ 359/529–538, 359/546–553; D5/42, 60; D12/101–106, D12/190

See application file for complete search history.

(56) References Cited

U.S. PATENT DOCUMENTS

| 4,245,888 A | * | 1/1981 | Wardecki .................. 359/549 |
| 4,770,495 A | * | 9/1988 | Lees ........................ 359/534 |
| 6,678,981 B1 | * | 1/2004 | Shoen et al. ................ 40/591 |

OTHER PUBLICATIONS

3M, Product Bulletin 680P SCOTCHLITE™ Plus Flexible Reflective Sheeting Series 680, Jan. 1997.*

* cited by examiner

*Primary Examiner*—Euncha P. Cherry
(74) *Attorney, Agent, or Firm*—Fay, Sharpe, Fagan, Minnich & McKee, LLP

(57) ABSTRACT

Retroreflective sheeting or tape suitable for the sides of tractor-trailers comprises alternating red and white colors separated by customized areas of sheeting or tape of predetermined locations and length. The customized areas may or may not comprise a retroreflective surface. Preferably, the retroreflective sheeting complies with all United States regulations on conspicuity systems for the sides of tractor-trailers, including box trailers, flatbed trailers, tankers, and the like.

1 Claim, 5 Drawing Sheets

REFLECTIVE SHEETING FOR TRACTOR-TRAILER

TECHNICAL FIELD

The present invention relates generally to reflective tape or sheeting. More specifically, the present invention relates to reflective tape or sheeting used in conjunction with tractor-trailers.

BACKGROUND OF THE INVENTION

Tractor-trailers are subject to numerous laws and regulations in an effort to increase the safety of highway traffic. One example of a regulation that attempts to increase highway safety is 49 C.F.R. §571.108 ("the Regulation"). One stated purpose of the Regulation is to enhance the conspicuity of motor vehicles on the public roads so that their presence is perceived and their signals understood, both in daylight and darkness.

One of the requirements of the Regulation pertains to tractor-trailers, and requires the trailers to have retroreflective sheeting, reflex reflectors, or a combination thereof, along, for example, the sides of the trailers. Retroreflective sheeting must consist of a smooth, flat, transparent exterior film with retroreflective elements embedded or suspended beneath the film so as to form a non-exposed retroreflective optical system. Retroreflective sheeting must comply with ASTM D4956 standards, except for photometric requirements, which can be found in FIG. 29 of the Regulation.

The Regulation requires that retroreflective sheeting be applied in a pattern of alternating white and red color segments to the sides and rear of the trailer, and to the rear of the truck tractor. Each red or white segment generally must have a width of not less than fifty (50) mm, and a length of one hundred fifty (150) to four hundred fifty (450) mm. However, the strip of reflective sheeting need not be a continuous strip of alternating red and white segments along the side of the trailer, as long as not less than half of the length of the trailer is covered and the spaces are distributed as evenly as practicable.

SUMMARY OF THE INVENTION

It is an object of the present invention to provide reflective sheeting or tape suitable for use with tractor-trailers.

It is another object of the present invention to provide reflective sheeting or tape that comprises alternating red and white colors with customized segments at predetermined locations.

Retroreflective sheeting or tape suitable for the sides of tractor-trailers comprises alternating red and white colors separated by customized areas of sheeting or tape of predetermined locations and length. The customized areas may or may not comprise a retroreflective surface. Preferably, the retroreflective sheeting complies with all United States regulations on conspicuity systems for the sides of tractor-trailers, including box trailers, flatbed trailers, tankers, and the like.

DETAILED DESCRIPTION OF THE INVENTION

The present invention will now be described in greater detail with reference to the appended drawings.

Figure 1:
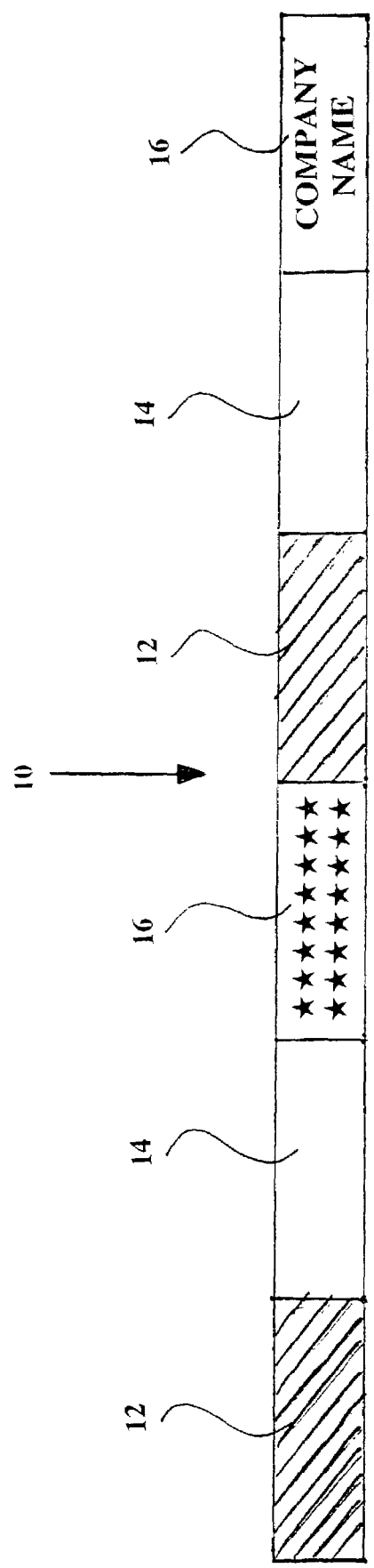
FIG. 1. is a top view of a section of reflective sheeting illustrating a customizable area, in accordance with a preferred embodiment of the present invention.
Figure 2:
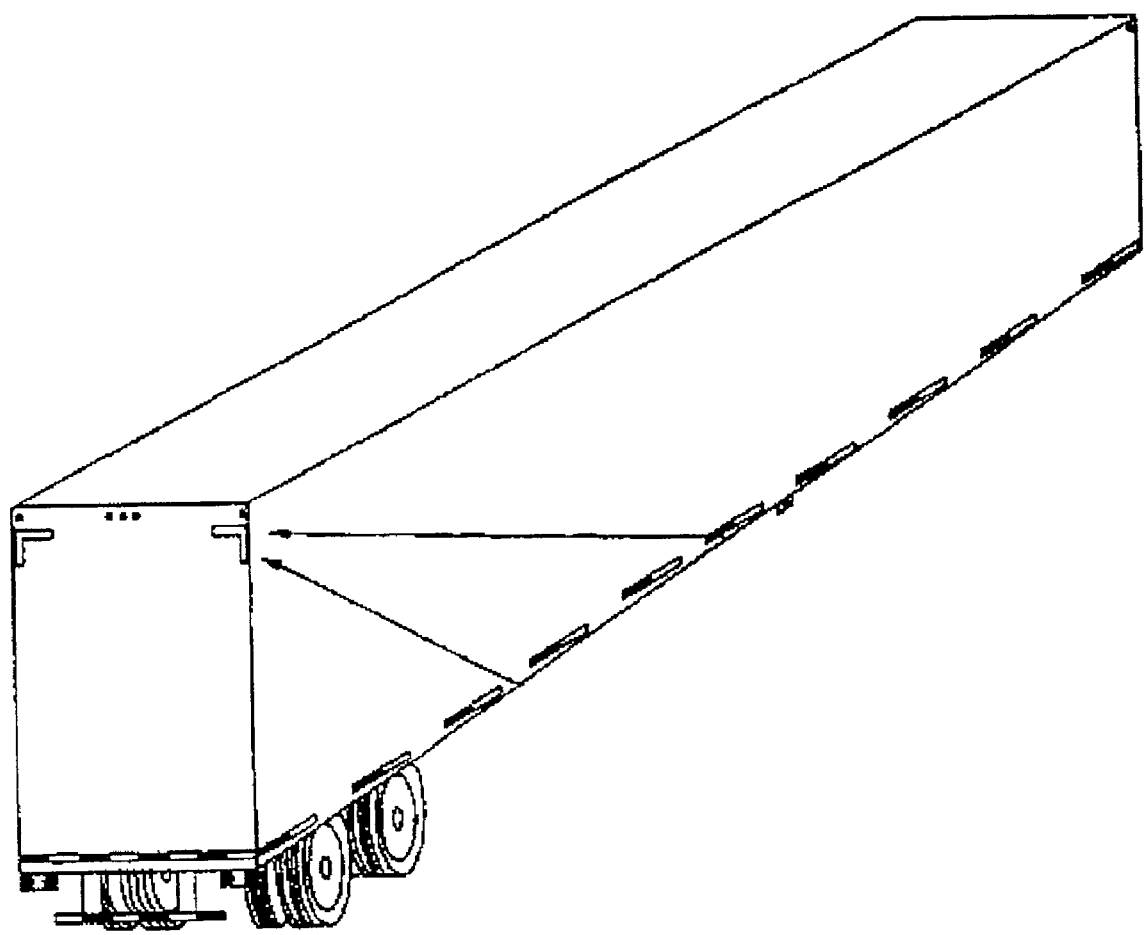
FIG. 2 is a perspective view of a box trailer with acceptable reflective sheeting configuration, as reproduced from 49 C.F.R. §571.108, FIG. 30-1.
Figure 3:
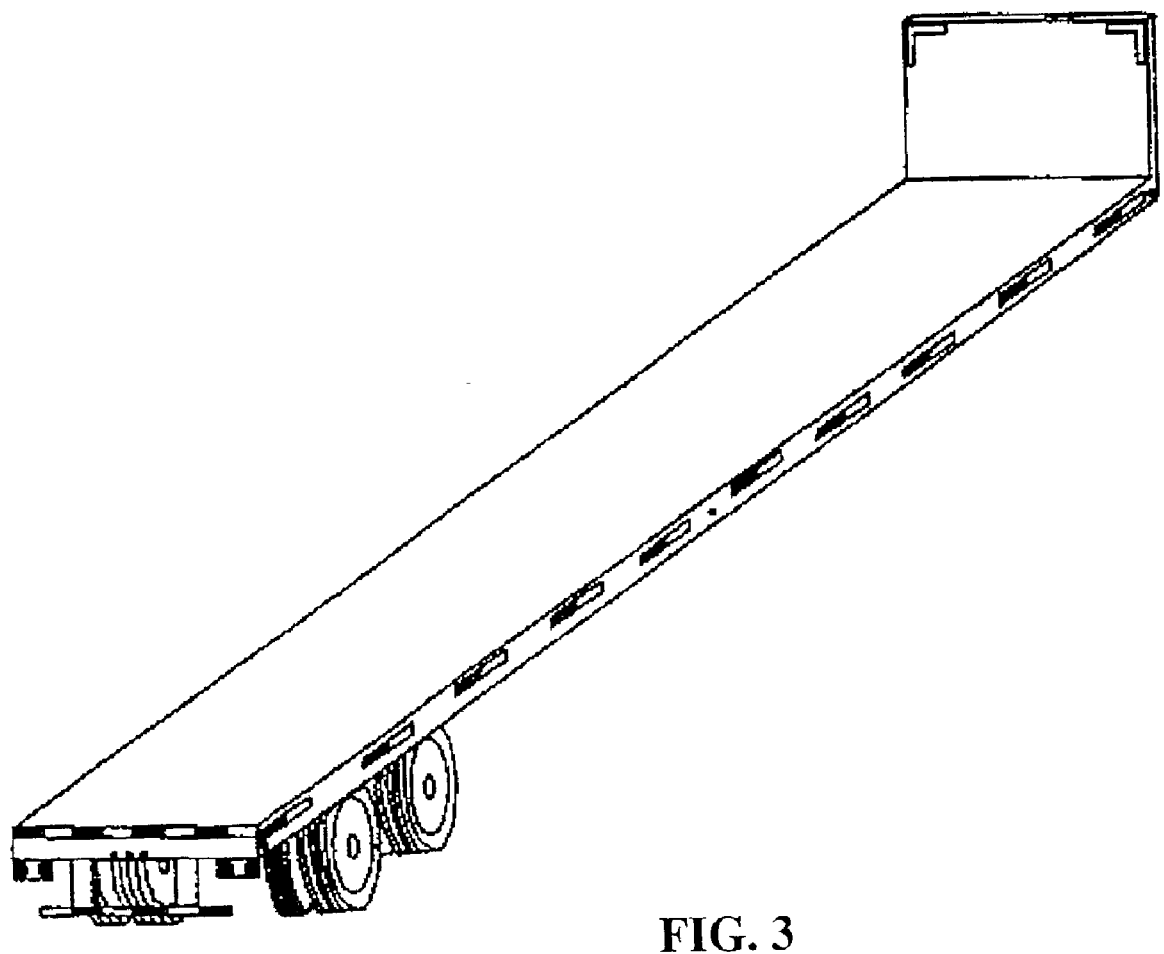
FIG. 3 is a perspective view of a flatbed trailer with acceptable reflective sheeting configuration, as reproduced from 49 C.F.R. §571.108, FIG. 30-2.
Figure 4:
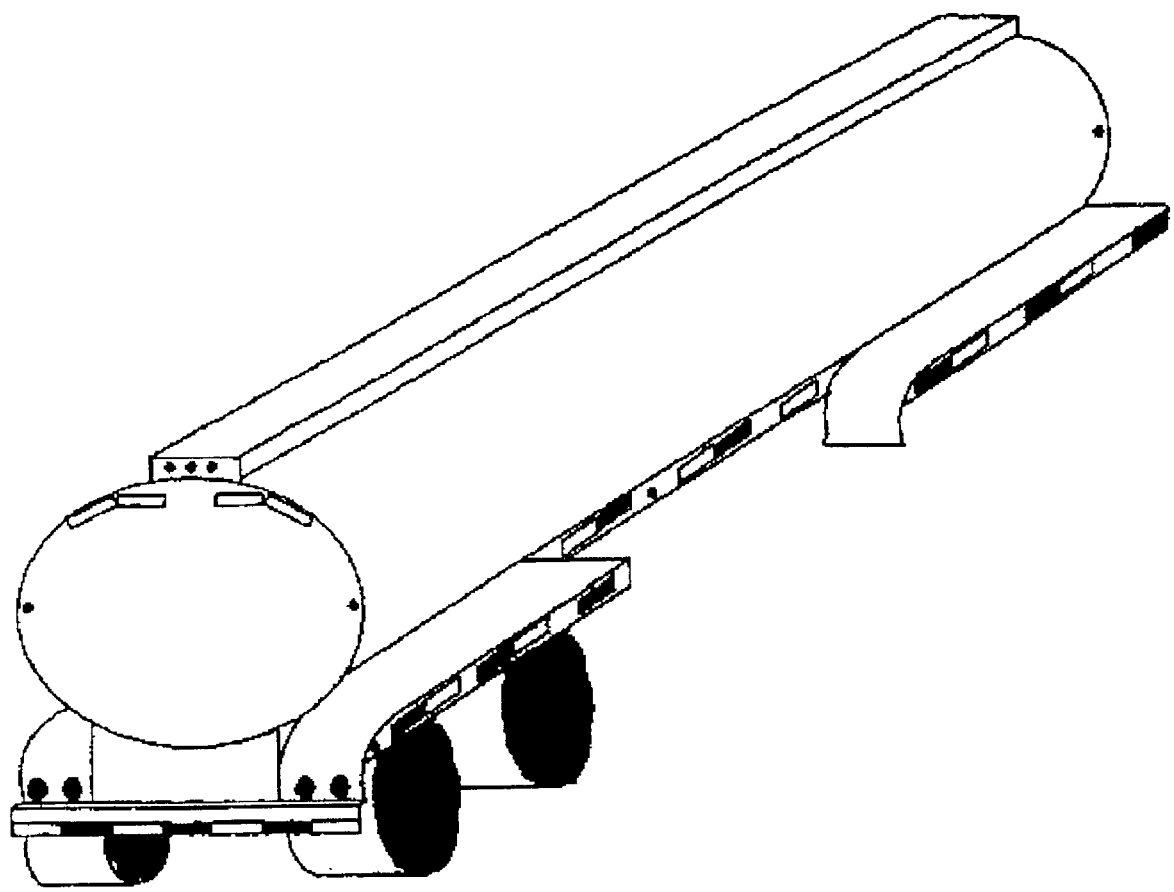
FIG. 4 is a perspective view of a tanker trailer with acceptable reflective sheeting configuration, as reproduced from 49 C.F.R. §571.108, FIG. 30-3.
Figure 5:
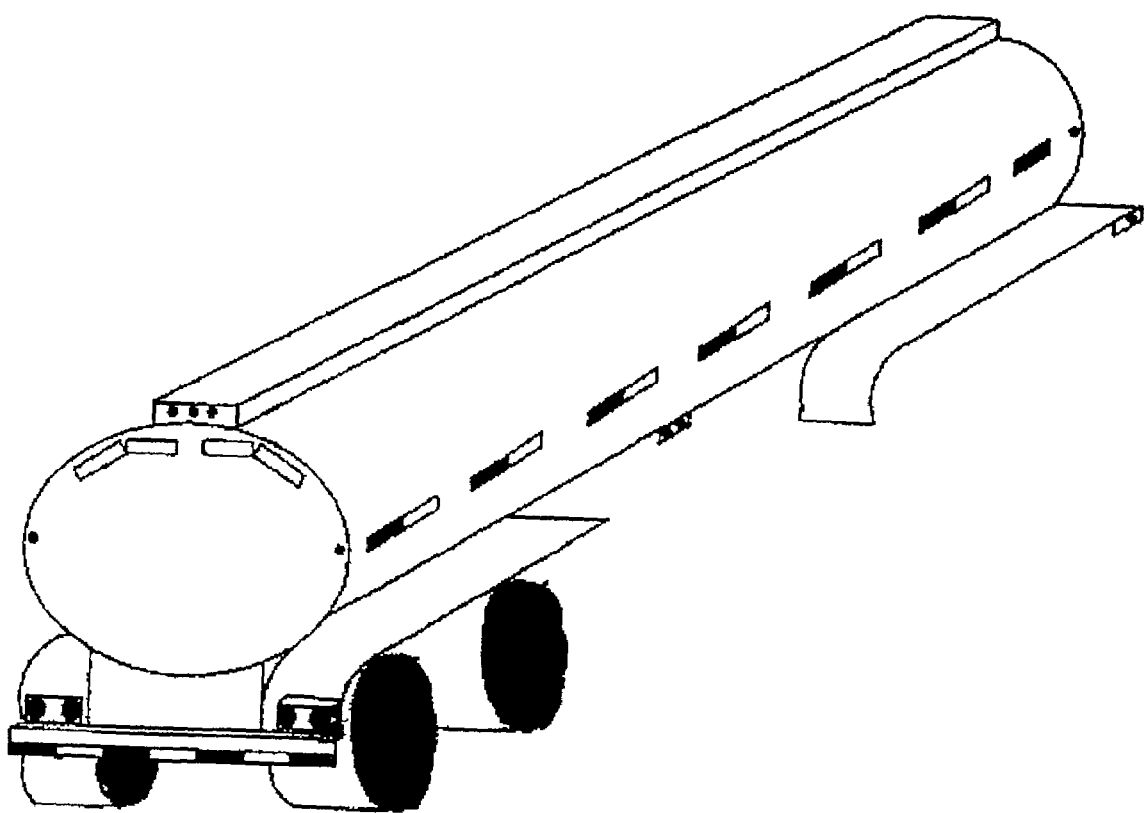
FIG. 5 is a perspective view of a tanker trailer with acceptable reflective sheeting configuration, as reproduced from 49 C.F.R. §571.108, FIG. 30-4.

A preferred embodiment of retroreflective sheeting for tractor-trailers, generally identified by reference number 10, is illustrated in FIG. 1. As illustrated in FIGS. 2–5, retroreflective sheeting, reflex reflectors, or a combination thereof must be applied to tractor-trailers along the sides and the rear of the trailer to comply with the conspicuity marking requirements of 49 C.F.R. §571.108 ("the Regulation"). The Regulation requires that at least half of the length of the sides of the trailer be covered with alternating red and white reflective sheeting, with spaces distributed as evenly as practicable.

The retroreflective sheeting must consist of a smooth, flat, transparent exterior film with retroreflective elements embedded or suspended beneath the film so as to form a non-exposed retroreflective optical system. Typically, the retroreflective sheeting utilizes an adhesive to affix the sheeting to the tractor-trailer surface. An example of retroreflective sheeting is SCOTHLITE, manufactured by the 3M Company of Minneapolis, Minn.

The retroreflective sheeting 10 of the present invention comprises alternating red 12 and white 14 segments separated by customized 16 segments of a predetermined length, location, and number. In a preferred embodiment, the retroreflective sheeting comprises repeating units of red 12, white 14, and customized 16 segments of equal size. However, any pattern that complies with the Regulation and has at least one customized segment is contemplated, and can be utilized without deviating from the scope of the present invention. Additionally, the customized 16 segments may or may not be retroreflective.

The red 12 and white 14 segments preferably have a length of approximately one hundred fifty (150) to four hundred fifty (450) millimeters (mm), and a width at least fifty (50) millimeters (mm). The customized 16 segments preferably have the same width, but may optionally have different lengths. However, the total length of customized segments in any given strip of sheeting is preferably not greater than fifty percent of the total length of the sheeting, because the Regulation mandates that not less than half of the length of the trailer is covered in red 12 and white 14 sections combined.

The customized 16 segments can comprise any of a plurality of colors, shapes, company indicia, or the like, whether reflective or not. A preferred embodiment of a customized 16 segment comprises retroreflective blue stars. The resultant color scheme of red-white-blue stars not only provides conspicuity markings, but also implies a patriotic theme as well. Another embodiment of a customized 16 segment comprises a trademark or company name located in the customized 16 segment. In this embodiment, the conspicuity marking would also serve to identify, inter alia, the owner of the truck or trailer. Additionally, a trucking company could sell advertising space in the customized areas.

The forgoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description illustrates the present invention and is not to be construed as limited to the specific embodiments disclosed.

What is claimed is:

1. Retroreflective sheeting for a vehicle, said sheeting comprising:

a strip of adhesive backed sheet defining a total length and comprising a plurality of alternating red and white retroreflective segments defining a regular visible safety pattern;

a plurality of customized segments defined as part of said strip of adhesive backed sheet, wherein each customized segment is located between one of said red segments and one of said white segments, and wherein at least one segment of said customized segments comprises text defining a trademark or a company name, wherein a combined length of all said customized segments in said strip of adhesive backed sheet defines not greater than fifty percent of said total length of said strip of adhesive backed sheet.

* * * * *